United States Patent [19]

Takeshima

[11] Patent Number: 5,585,860
[45] Date of Patent: Dec. 17, 1996

[54] REPRODUCTION CIRCUIT FOR SKIN COLOR IN VIDEO SIGNALS

[75] Inventor: Masahiro Takeshima, Ibaraki, Japan

[73] Assignee: Matsushita Electric Industrial Co., Ltd., Osaka, Japan

[21] Appl. No.: 421,370

[22] Filed: Apr. 12, 1995

[30] Foreign Application Priority Data

Apr. 15, 1994 [JP] Japan ................................. 6-077090

[51] Int. Cl.⁶ ................................................. H04N 9/64
[52] U.S. Cl. .................................................. 348/652
[58] Field of Search .............................. 348/649–654, 348/645–647; H04N 9/64, 9/68

[56] References Cited

U.S. PATENT DOCUMENTS 3,729,578  4/1973  Slusarski ..................... 348/652
5,381,185  1/1995  Ohki et al. ................... 348/652
5,384,601  1/1995  Yamashita et al. ............ 348/652

FOREIGN PATENT DOCUMENTS 3-148987  6/1991  Japan .
4-88792   3/1992  Japan .
4-150689  5/1992  Japan .

*Primary Examiner*—Micheal H. Lee
*Attorney, Agent, or Firm*—Ratner & Prestia

[57] ABSTRACT

A skin-color-area detector generates a skin-color-area signal from an input video signal. An average luminance level detector generates an average luminance level signal from a luminance signal. These signals are transmitted to a skin-color-corrector to generate skin-color-correction signals. At a saturation controller and at a luminance signal corrector which each receive the skin color corrections signals, skin-color is optimumly corrected. Thereby reproduction quality of skin-color signals in video signals is enhanced.

9 Claims, 4 Drawing Sheets

REPRODUCTION CIRCUIT FOR SKIN COLOR IN VIDEO SIGNALS

BACKGROUND OF THE INVENTION

The present invention relates to the enhancement of skin color signals included in video signals, and more particularly relates to a circuit which enhances the reproduction quality of skin color in video signals in response to average luminance levels of video signals, skin color area in the video signals, and average luminance level of skin color in video signals. Further, the present invention relates to an improvement in a circuit which enhances the reproduction quality of skin color in video signals in response to skin color area in video signals, average luminance level of skin color in video signals and average luminance levels in video signals.

Recently, a television receiver (TV) with a wider than normal screen has drawn significant attention in the market. Consequently, the demand on picture quality has become more severe. Since human eyes are particularly sensitive to skin color reproduction, skin color reproduction capability greatly influences picture quality.

The prior art for improving the reproduction quality of skin color signals in video signals is described below. FIG. 4 is a block diagram of a skin-color-luminance enhancement circuit in accordance with the prior art.

Average luminance-level detector 3 detects an average luminance level of an input video signal. When video luminance signal of one frame is integrated, an average luminance for one frame results.

Skin-color-waveform detecting circuit (hereinafter called "detector") 7 detects a skin color signal from a color-difference-signal of a received video signal. The average luminance output from average- luminance-level detector 3 and the skin-color waveform output from the skin-color waveform detector 7 are transmitted to skin-color-waveform correction circuit (hereinafter called "corrector") 8.

An output of a correction signal from the color-waveform-corrector 8 is transmitted to a luminance-signal-corrector 9, where a correction signal is added to the luminance signal before being output.

A conventional skin-color-luminance enhancement circuit so structured enhances the skin-color-luminance level in response to an average luminance level of the video signal. However, skin color is darkened and dimmed by secondary effects from Auto Contrast Level which adjusts beam intensity from a cathode ray tube (CRT) and Black Level Enhancement which adjusts a black level in the video signal.

According to this conventional structure, skin color is corrected by using only the average luminance level of the video signal. Thus, skin color is not adequately corrected in response to skin color condition. Consequently, gradation on skin color is not fully displayed, because an average luminance level of the video signal may stand at a high level even if the luminance level of skin color is maintained at a high level. This further boosts the skin-color luminance.

SUMMARY OF THE INVENTION

The present invention relates to a skin-color reproduction circuit which enables TV viewers to see optimal skin-color reproduction.

A first exemplary embodiment of the present invention includes a skin-color-area detector for detecting skin-color-area from multiple color difference signals in a video signal, an average-luminance-level detector for detecting an average luminance level from luminance signals, a skin-color corrector for producing skin-color-correction signals based on both the average luminance level signal and the skin-color-area signal, a saturation controller for receiving a skin color correction signal and color difference signals and for generating modified color difference signals corresponding to a picture with enhanced skin color, a luminance-signal corrector for receiving a luminance signal and a skin-color correction signal to generate a modified luminance signal.

A second exemplary embodiment of the present invention includes a configuration similar to the first embodiment, however, the skin-color-area detector is replaced with an average skin-color-luminance-level detector for generating an average luminance level signal based on the luminance signal and the color difference signals.

A third exemplary embodiment of the present invention includes a configuration similar to the first embodiment and further includes an average skin-color-luminance-level detector for generating a signal corresponding the average luminance level of the luminance signal and the color difference signal.

In accordance with the first exemplary embodiment of the present invention, a skin-color-correction signal is generated in response to input signals received from the skin-color-area detector and from the average-luminance-level detector.

In accordance with the second exemplary embodiment of the present invention, a skin-color-correction signal is generated in response to input signals received from the average luminance-level detector and from the average skin-color-luminance-level detector.

In accordance with the third exemplary embodiment of the present invention, a skin-color-correction signal is generated in response to input signals received from the skin-color-area detector, the average skin-color-luminance-level detector, and the average luminance-level detector.

In accordance with the three exemplary embodiments of the invention, an optimal skin-color correction which responds to the video signal condition is conducted by using the output signal from each skin-color-corrector at the saturation controller as well as the luminance-signal-corrector.

DETAILED DESCRIPTION OF THE EMBODIMENT

First Exemplary Embodiment

Figure 1:
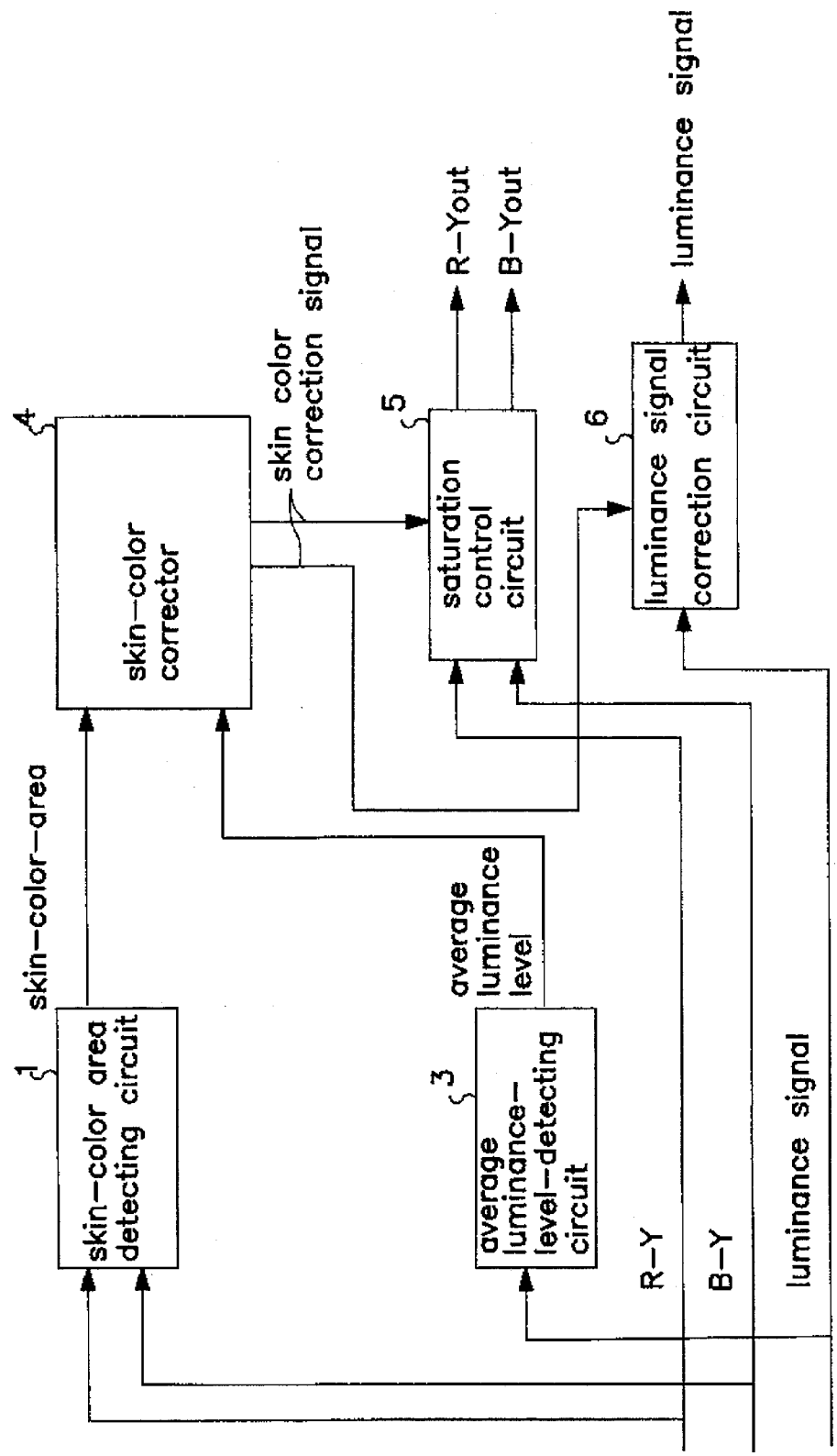
FIG. 1 is a block diagram of a skin-color reproduction circuit in accordance with the first exemplary embodiment of the present invention.

FIG. 1 is a block diagram illustrating a skin-color reproduction circuit in accordance with a first exemplary embodiment of the present invention. In FIG. 1, skin-color-area detector 1 detects skin-color area in one frame from color difference signals R-Y and B-Y of input video signals, and supplies the detected skin-color-area to skin-color corrector 4.

Average-luminance-level detector 3 detects an average-luminance-level in one frame from an luminance signal of input video signals, and supplies the detected average-luminance-level to skin-color corrector 4.

The detected skin-color-area and the detected average-luminance-level are fed into the skin-color-corrector 4 to produce a skin-color-correction signal based on both the skin-color-area and the average luminance-level in one frame of input video signals.

The skin-color-correction signal from skin-color-corrector 4 and the color difference signals R-Y, B-Y of the video signals are transmitted to saturation controller 5 to apply a saturation control in response to the skin-color-correction signal which is applied to a skin-color component in the color difference signals of the video signal.

Luminance signal corrector 6 applies a signal in response to the skin-color-correction signal which is applied to the skin-color component in the luminance signal of the video signal by transmitting the skin-color-correction signal from skin-color-corrector 4 and the luminance signal of the video signal.

An operation of a skin-color reproduction circuit having the above configuration is explained.

First, at skin-color-area detector 1 in FIG. 1, the skin-color-area in one frame is detected from the color difference signals R-Y, B-Y, and the detected area is transduced into a voltage.

As is generally known, the color difference signal R-Y is behind the color difference signal B-Y by 90 degrees, and the so called "skin-color-signal" is behind the color difference signal B-Y by around 120 degrees (Phase location A). Therefore, when color-difference-signals B-Y and R-Y within a certain phase-scope from Phase location A are extracted and compounded, a skin-color signal can be detected. Thus, when varying the threshold of the phase-scope, a detection area can be changed depending on the scope of the skin color.

Therefore, integral of a duration time detecting the skin-color area in one frame (or one field) period would find an area of skin-color in one frame (or one field).

Second, at the average-luminance level detector 3, the average luminance level in one frame (or one field) is detected from the luminance signal of the input video signal, and the detected level is transduced into a voltage. As is known to one of ordinary skill in the art, integral of video luminance signals in one frame would find an average luminance level in one frame.

In addition, an output from a detector is not limited to a voltage but may be an electric current.

The detected values of skin-color-area and average-luminance level are multiplied by coefficients when necessary, and are transmitted to skin-color-corrector 4 to produce the skin-color correction signal responding to the average luminance level and skin-color-area in one frame before being transduced into a voltage or an electric current as an output.

The output skin-color-correction signal is first transmitted to saturation controller 5, and next, skin-color-correction signal is multiplied by the coefficients $\alpha$ and $\beta$ Then, the skin-color component of the color difference signal R-Y and B-Y is multiplied with a saturation control responding to the multiplied skin-color correction signals.

The skin-color-correction signal is also transmitted to luminance corrector 6, multiplied by the coefficient $\gamma$ before the skin-color component of the luminance signal is multiplied by signal correction.

At saturation controller 5 and luminance signal corrector 6, only part of the phase threshold of the color difference signals B-Y, R-Y may be controlled in order to control only the skin-color component.

According to the above exemplary first embodiment, saturation of the skin-color component is controlled depending on the result of detecting the average luminance-level and skin-color-area in one frame, and the skin-color component of the luminance signal is controlled depending on the result of detecting the skin-color-area and average luminance level in one frame. Thus, skin-color can be optimally corrected in responding to the skin-color-area as well as the average-luminance-level of the picture.

Second Exemplary Embodiment

Figure 2:
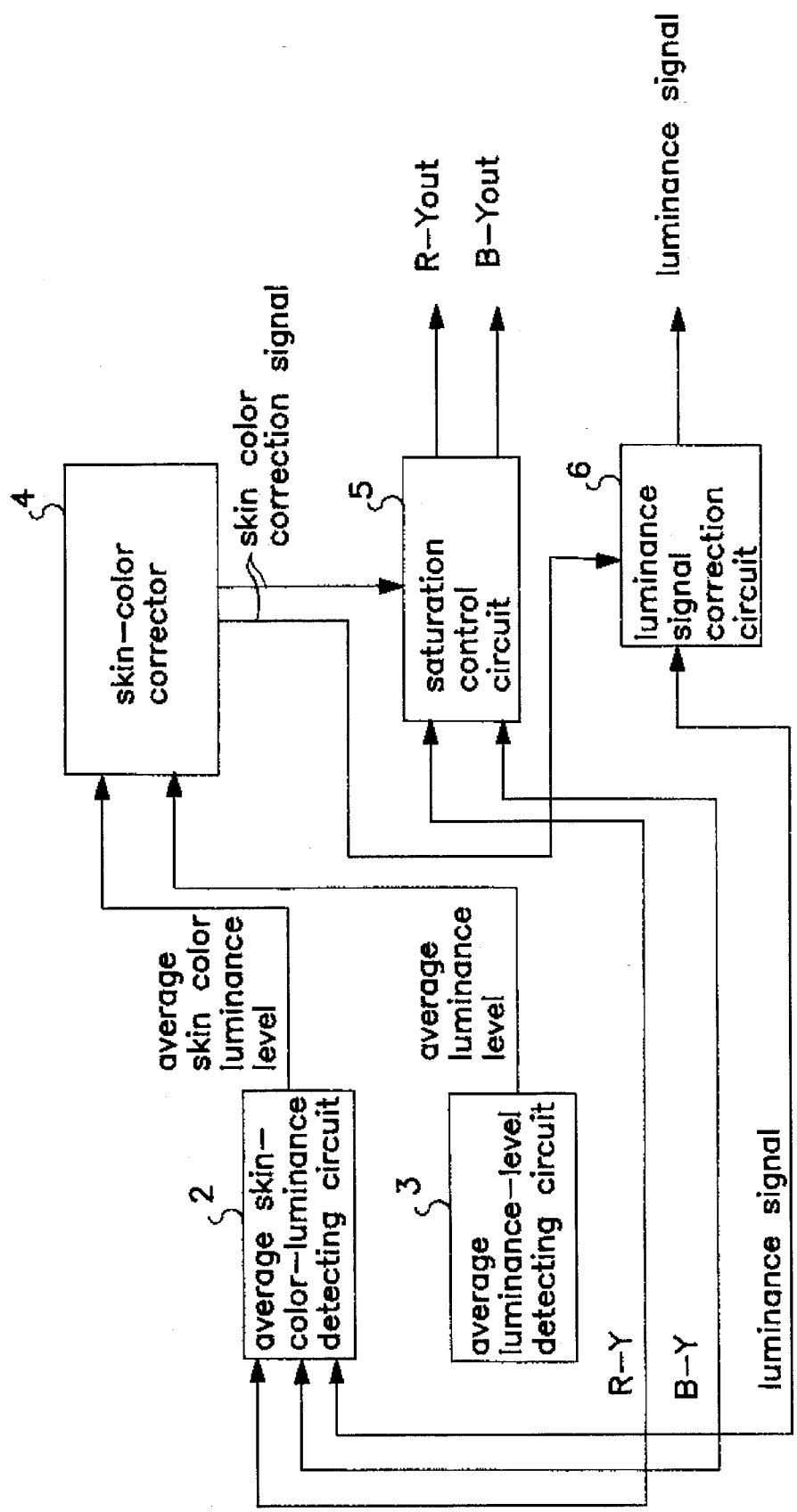
FIG. 2 is a block diagram of the skin-color reproduction circuit in accordance with the second exemplary embodiment of the present invention.

FIG. 2 is a block diagram illustrating the skin-color reproduction circuit in accordance with a second exemplary embodiment of the present invention. The configuration in FIG. 2 has an average skin-color-luminance-level detector 2 instead of the skin-color area detector 1 in FIG. 1. The average skin-color-luminance level detector 2 detects the average luminance-level of the skin-color in one frame from the color difference signals R-Y, B-Y and the luminance signal of the input video signal.

Other aspects of the second exemplary embodiment are similar to the first exemplary embodiment. Thus, further description is omitted.

Operation of a skin-color reproduction circuit in accordance with the above configuration is explained below.

First, at average skin-color-luminance-level detector 2 in FIG. 2, the average luminance-level of the skin-color-component in one frame is detected by using the color difference signals R-Y, B-Y and luminance signal. The detected result is transduced into a voltage signal.

A method of detecting the average-luminance-level of the skin-color-component was explained with regard to the first exemplary embodiment. The result is then divided by the skin-color area to obtain the average luminance level.

Second, at average luminance-detector 3, the average luminance level in one frame is detected from the luminance signal of the video signals. The detected result is transduced into a voltage signal. The output from the detector is not, however, limited to a voltage signal. An electric current may also be used.

The detected values are transmitted to skin-color-corrector 4 shown in FIG. 2 to produce the skin-color-correction signal responding to the average luminance level of skin-color in one frame and the average luminance level in one frame. The skin-color-correction signal is transduced into a voltage signal or an electric current signal before being output.

The output skin-color-correction signal from the skin-color-corrector is first transmitted to saturation controller 5 to apply the saturation control responding to the skin-color-correction signal to the skin-color component of the color difference signals of the video signals.

Third, the skin-color-correction signal is transmitted also to luminance signal corrector 6, and signal correction responding to the skin-color correction signal is applied to the skin color component of the luminance signal of video signals.

Each input can be multiplied by coefficients when necessary before computation, which is similar to the first exemplary embodiment.

According to the second exemplary embodiment, the skin-color can be optimally corrected through detecting the average luminance level of the skin-color component as well as the average luminance level in one frame.

Third Exemplary Embodiment

Figure 3:
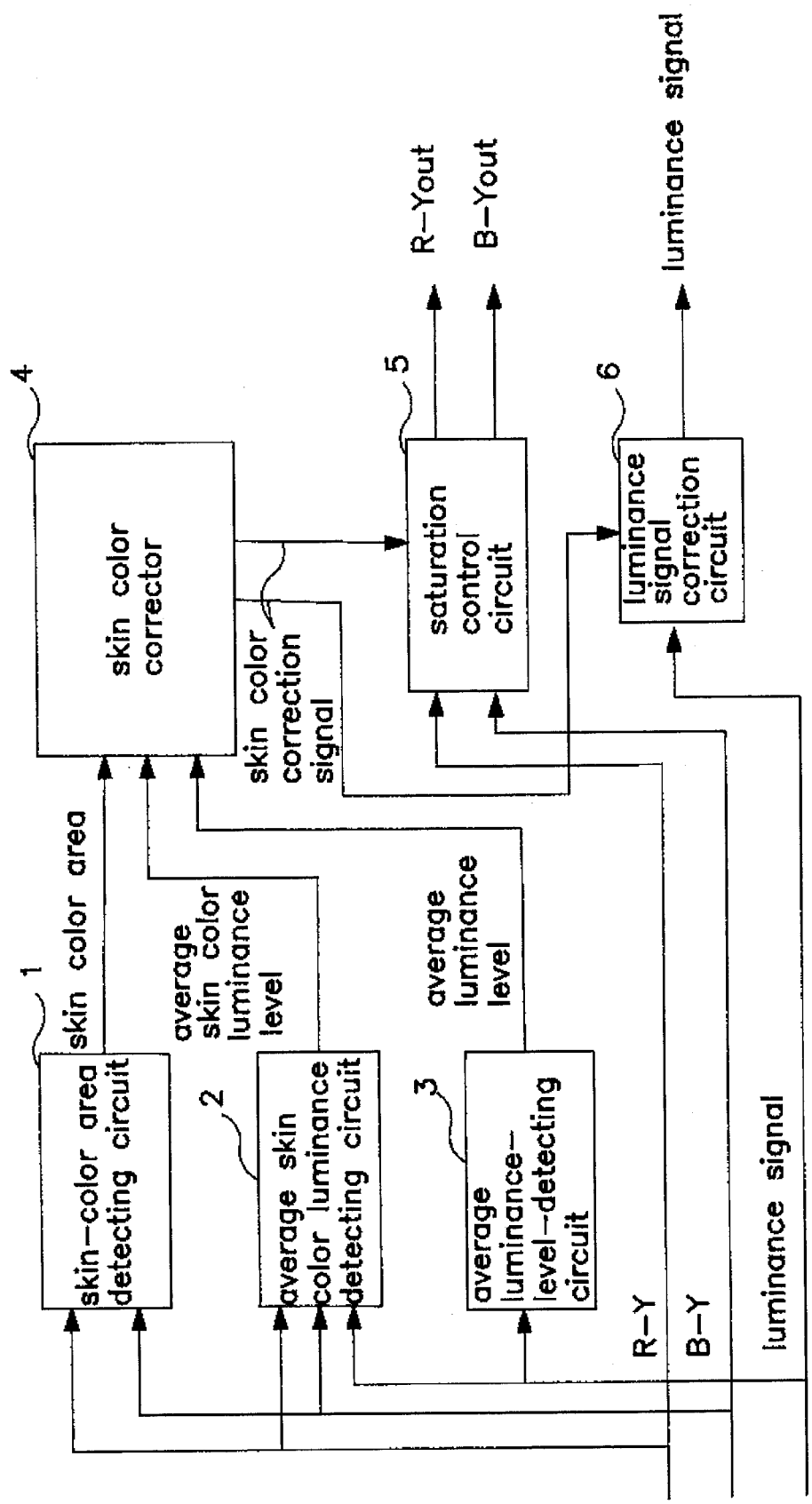
FIG. 3 is a block diagram of a skin-color reproduction circuit in accordance with the third exemplary embodiment according to the present invention.
Figure 4:
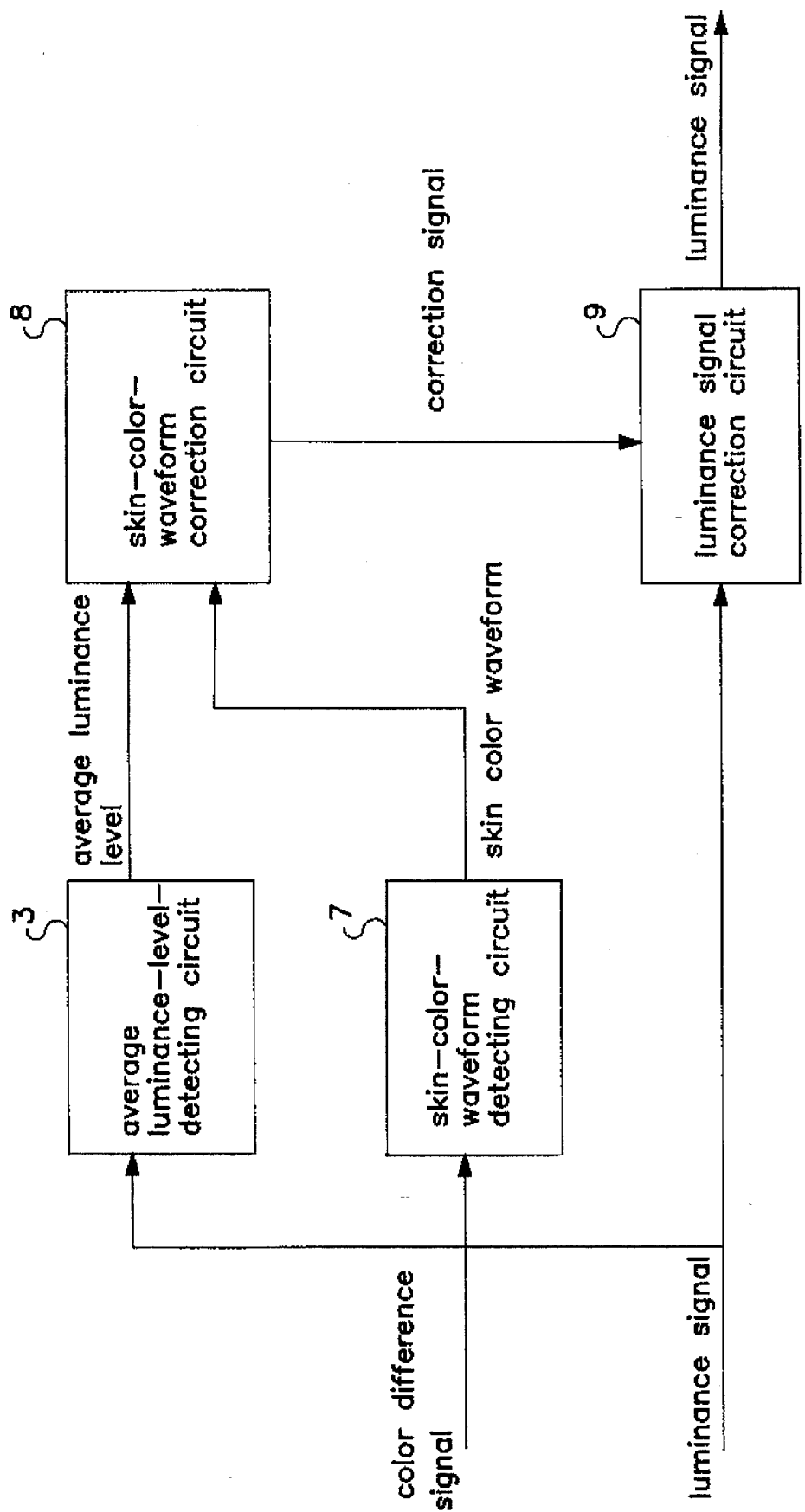
FIG. 4 is a block diagram of a skin-color-luminance enhancement circuit of a video signal in accordance with the prior art.

FIG. 3 is a block diagram illustrating the skin-color reproduction circuit in accordance with a third exemplary embodiment of the present invention.

In FIG. 3, average skin-color-luminance-level detector 2 which is used in the second exemplary embodiment is added to the configuration of the first exemplary embodiment. Other aspects of the third exemplary embodiment are similar to the first exemplary embodiment. Thus, further description is omitted.

Operation of the third exemplary embodiment having the above configuration is explained below.

First, at skin-color-area detector 1 in FIG. 3, the skin-color area in one frame is detected from the color difference signals R-Y, B-Y of input video signals, and then the result of detecting is transduced into a voltage signal.

Second, at average skin-color-luminance-level detector 2, the average skin-color-luminance-level in one frame is detected from the color difference signals and luminance signal of input video signals. The result of detecting is then transduced into a voltage signal.

Third, at average-luminance-level detector 3, the average luminance level in one frame is detected from the luminance signals of input video signals. The result of detecting is then transduced into a voltage signal. Each output from the detectors is not limited to a voltage signal but can be an electric current signal.

The detected values are transmitted to skin-color-corrector 4 shown in FIG. 3 to produce the skin-color-correction signal responding to the skin-color-area, the average skin-color-luminance-level and average luminance level in one frame. The produced signal is transduced into a voltage signal or an electric current signal before output. The output skin-color-correction signal is first transmitted to saturation controller 5, then a saturation control responding to the skin-color-correction signal from skin-color corrector 4 is applied to the skin-color components of the color difference signals R-Y, B-Y of video signals.

The skin-color-correction signal is also fed to luminance-signal-corrector 6, and a signal correction responding to the skin-color-correction signal is applied to the skin-color component of the luminance signal.

Each input can be multiplied by coefficients when necessary before computation, which is similar to the first exemplary embodiment.

According to the third exemplary embodiment, an optimal skin-color correction for reproducing the more live skin-color in response to the skin color condition (area and luminance) and the average luminance level in the video signals is achieved by detecting, in one frame, the skin-color-area, the average skin-color-luminance-level and the average luminance level.

Each output from the skin-color-area-detector, average skin-color luminance-level detector, average luminance detector, skin-color corrector, etc. may be either an analog value or a digital value depending on the configuration in use.

Detailed configurations of each block described above would be apparent to one of ordinary skill in the art.

Although the description above refers to "one frame", the description is also applicable to "one field" without entailing any functional changes.

According to the video signal skin-color-corrector of the present invention, optimal correction to the skin-color in response to the skin-color-area and average luminance level of video signals can be achieved.

Further, an optimal correction to the skin-color in response to the average skin-color-luminance-level and average luminance level of video signals can be achieved.

Further, an optimal correction to the skin-color in response to the skin-color-area, average skin-color-luminance-level, and average luminance level of video signals can be also achieved.

The present invention thus enables TV viewers to appreciate optimally corrected skin-color.

is claimed:

1. Means for enhancing skin color in an image which corresponds to a video signal which includes a plurality of color difference signals and a luminance signal, comprising:

skin-color-area detector means for generating a skin color component area signal from said plurality of color difference signals;

average luminance-level detector means for generating an average luminance level signal from said luminance signal;

skin-color corrector means for receiving said skin color component area signal and said average luminance level signal and for generating a skin-color-correction signal;

saturation controller means for receiving said skin-color-correction signal and said plurality of color difference signals and for generating a plurality of modified color difference signals which correspond to said image with enhanced skin color;

luminance corrector means for receiving said skin-color-correction signal and said luminance signal and for generating a modified luminance signal which corresponds to said image with enhanced skin color.

2. Means for enhancing skin color in an image which corresponds to a video signal which includes a plurality of color difference signals and a luminance signal, comprising:

average skin-color-luminance-level detector means for generating an average skin-color-luminance-level signal from said plurality of color difference signals and said luminance signal;

average-luminance-level detector means for generating an average-luminance-level signal from said luminance signal;

skin-color corrector means for receiving said average skin-color-luminance-level signal and said average-luminance-level signal and for generating a skin-color-correction signal;

saturation controller means for receiving said skin-color-correction signal and said plurality of color difference signals and for generating a plurality of modified color difference signals which correspond to said image with enhanced skin color;

luminance corrector means for receiving said skin-color-correction signal and said luminance signal and for generating a modified luminance signal which corresponds to said image with enhanced skin color.

3. Means for enhancing skin color in an image which corresponds to a video signal which includes a plurality of color difference signals and a luminance signal, comprising:

skin-color-area detector means for generating a skin color component area signal from said plurality of color difference signals;

average skin-color-luminance-level detector means for generating an average skin-color-luminance-level signal from said plurality of color difference signals and said luminance signal;

average-luminance-level detector means for generating an average-luminance-level signal from said luminance signal;

skin-color-corrector means for receiving said skin-color-component area signal, said average skin-color-luminance-level signal, and said average luminance level signal and for generating a skin-color-correction signal;

saturation controller means for receiving said skin-color-correction signal and said plurality of color difference signals and for generating a plurality of modified color difference signals which correspond to said image with enhanced skin color;

luminance corrector means for receiving said skin-color-correction signal and said luminance signal and for generating a modified luminance signal which corresponds to said image with enhanced skin color.

4. Means for enhancing skin color in an image which corresponds to a video signal according to claim 1, wherein each of said skin-color-correction signal, and said average luminance level signal is one of a voltage Signal and an electric current signal.

5. Means for enhancing skin color in an image which corresponds to a video signal according to claim 2, wherein each of said skin-color-correction signal, said average skin-color-luminance-level signal, and said average luminance level signal is one of a voltage signal and an electric current signal.

6. Means for enhancing skin color in an image which corresponds to a video signal according to claim 3, wherein each of said skin-color-correction signal, said average skin-color-luminance-level signal, and said average luminance level signal is one of a voltage signal and an electric current signal.

7. Means for enhancing skin color in an image which corresponds to a video signal according to claim 1, wherein each of said skin-color-correction signal and said average luminance level signal is generated for one of a single frame and a single field of said video signal.

8. Means for enhancing skin color in an image which corresponds to a video signal according to claim 2, wherein each of said skin-color correction signal, said average skin-color-luminance level signal and said average luminance-level signal is generated for one of a single frame and a single field of said video signal.

9. Means for enhancing skin color in an image corresponds to a video signal according to claim 3, wherein each of said skin-color correction signal, said average skin-color-luminance-level signal and said average luminance-level signal is generated for one of a single frame and a single field of said video signal.

* * * * *

UNITED STATES PATENT AND TRADE MARK OFFICE
CERTIFICATE OF CORRECTION

PATENT NO.   : 5,585,860
DATED        : December 17, 1996
INVENTOR(S)  : Takeshima It is certified that error appears in the above-identified patent and that said Letters Patent is hereby corrected as shown below:

Column 7, line 32, after the word "signal" delete the comma ",".

Column 8, line 1, the word "Signal" should be --signal--.

Column 8, line 25, after the word "image" insert the word --which--.

Signed and Sealed this

Twentieth Day of May, 1997

*Attest:*

BRUCE LEHMAN

*Attesting Officer*         *Commissioner of Patents and Trademarks*